United States Patent [19]
Maass et al.

[11] Patent Number: 5,222,844
[45] Date of Patent: Jun. 29, 1993

[54] AIR LOGIC CIRCUIT FOR AIRFEED PECK DRILL

[75] Inventors: James A. Maass; John F. Stewart; Joseph F. Carter, all of Lexington, S.C.

[73] Assignee: Cooper Industries, Inc., Houston, Tex.

[21] Appl. No.: 816,529

[22] Filed: Dec. 30, 1991

Related U.S. Application Data

[63] Continuation of Ser. No. 396,995, Aug. 22, 1989, abandoned, which is a continuation-in-part of Ser. No. 114,957, Oct. 30, 1987, abandoned.

[51] Int. Cl.⁵ ............................................. B23B 47/22
[52] U.S. Cl. ................................... 408/17; 173/19; 408/130
[58] Field of Search .................. 408/10, 11, 12, 14, 408/17, 130; 173/19

[56] References Cited

U.S. PATENT DOCUMENTS

| | | | |
|---|---|---|---|
| D. 139,795 | 12/1944 | Terry | D15/138 |
| D. 139,796 | 12/1944 | Terry | D15/138 |
| D. 309,616 | 7/1990 | Carter et al. | D15/138 |
| D. 315,279 | 3/1991 | Stewart et al. | D8/61 |
| D. 315,280 | 3/1991 | Stewart et al. | D8/61 |
| D. 316,508 | 4/1991 | Stewart et al. | D8/68 |
| 2,578,454 | 12/1951 | Saives | 408/17 X |
| 2,579,459 | 12/1951 | Allen | 173/19 |
| 2,625,844 | 1/1953 | Becket et al. | 408/130 X |
| 2,686,440 | 8/1954 | Van Cutsem | 408/61 |
| 2,689,363 | 9/1954 | Frye | 408/11 |
| 2,791,922 | 5/1957 | Robinson | 173/19 |
| 2,852,965 | 9/1958 | Wallace | 408/17 |
| 2,909,949 | 10/1959 | Winslow | 408/10 |
| 2,977,826 | 4/1961 | Radford | 173/19 |
| 3,273,425 | 9/1966 | Hodgson | 408/17 |
| 3,286,555 | 11/1966 | Klancnik | 408/11 |
| 3,398,609 | 8/1968 | Schott | 408/61 |
| 3,609,054 | 9/1971 | Nyman | 408/17 |
| 3,625,622 | 12/1971 | Wright | 408/11 |
| 3,663,138 | 5/1972 | Petroff | 408/130 |
| 3,680,970 | 8/1972 | Deschner | 408/17 |
| 4,123,188 | 10/1978 | Deremo et al. | 408/17 |
| 4,350,212 | 9/1982 | Hirose | 408/10 X |
| 4,362,444 | 12/1982 | Watkins | 408/17 |
| 4,421,441 | 12/1983 | Hirose | 408/17 |
| 4,534,683 | 8/1985 | Colliau | 408/17 |
| 4,594,030 | 6/1986 | Weigel, Jr. | 408/10 |
| 4,867,617 | 9/1989 | Maass et al. | 408/17 |
| 4,961,675 | 10/1990 | Stewart | 408/1 R |
| 5,001,826 | 3/1991 | Stewart et al. | 408/17 X |

Primary Examiner—Z. R. Bilinsky
Attorney, Agent, or Firm—Donald J. Verplancken; David A. Rose

[57] ABSTRACT

An improvement to an air logic circuit for an airfeed peck drill includes the insertion of an advance valve into the timer circuit. This advance valve generates a signal to actuate the timer circuit only after the drill quill has fed forward through rapid advance.

11 Claims, 2 Drawing Sheets 5,222,844

AIR LOGIC CIRCUIT FOR AIRFEED PECK DRILL

This is a continuation of copending application Ser. No. 07/396,995 filed on Aug. 22, 1989 abandoned, which is a continuation in part of U.S. Pat. application Ser. No. 07/114,957, filed Oct. 30, 1987, now abandoned.

BACKGROUND OF THE INVENTION

The present invention relates to airfeed tools, more particularly the present invention relates to air logic circuits for airfeed tools.

The use of peck drilling in heavy industry, particularly industry which requires the drilling of a plurality of holes in a variety of metal pieces, has shown a dramatic increase in recent years. This is because the holes resulting from a peck drilling operation exhibit greater accuracy than holes drilled by conventional drilling operations. Additionally, the surface finish of the hole is much smoother than obtained with conventional drills.

U.S. Pat. No. 4,123,188 to Deremo et al. and U.S. Pat. No. 4,421,441 to Hirose are representative of the design of airfeed peck drills. Such prior art airfeed peck drills include a motor and reduction gearing which is contained within a cylinder to form a drill quill which is attached to the end of an air cylinder. The air cylinder in these prior art drills is used to advance and retract the drill quill into and out of a workpiece. In order to prevent the drill quill from feeding forward before being fully retracted, the back pressure created by the returning quill is used as a signal.

On newer airfeed drills, different sized areas are used on the feed-retract piston. The air logic circuitry as disclosed in U.S. Pat. No. 4,123,188 will not provide the necessary signal to prevent the tool from feeding forward until fully retracted.

Another problem with present Air Feed Peck Drills is the inability to adjust the timing circuitry to compensate for the increased time necessary to actuate the drill bit from the retracted position to the bottom of the hole as the depth of the hole increases. In current air feed peck drills, the timing circuitry which controls the duration of the pecking cycle, or the duration of inward drill stroke, is initiated by the actuation of the peck drill into the working material being drilled, and is not actuated by the actual proximity of the drill bit with the bottom of the hole. As a result, where the drill might rotate through ten revolutions when drilling at the top of the hole, as the hole deepens the time spent at the bottom of the hole, and duration of actual drilling, decreases. In extreme cases, the drill will not reach the bottom of the hole before the timing circuit causes the drill quill to retract.

There is therefore a need in the art to provide an air logic circuit which will compensate for the changing duration of the stroke into the hole as the hole deepens to maintain a relatively constant duration of actual hole drilling.

SUMMARY OF THE INVENTION

An improvement in an air logic circuit for an airfeed peck drill having an advance valve disposed in the timer circuit to actuate the timer to time the length of each peck cycle only upon the actuation of the drill bit into the hole adjacent to the work surface.

BRIEF DESCRIPTION OF THE DRAWINGS

A better understanding of the improvement to the air logic circuit of an airfeed peck drill of the present invention may be had by reference to the drawings wherein.

DESCRIPTION OF THE EMBODIMENTS

Figure 1:
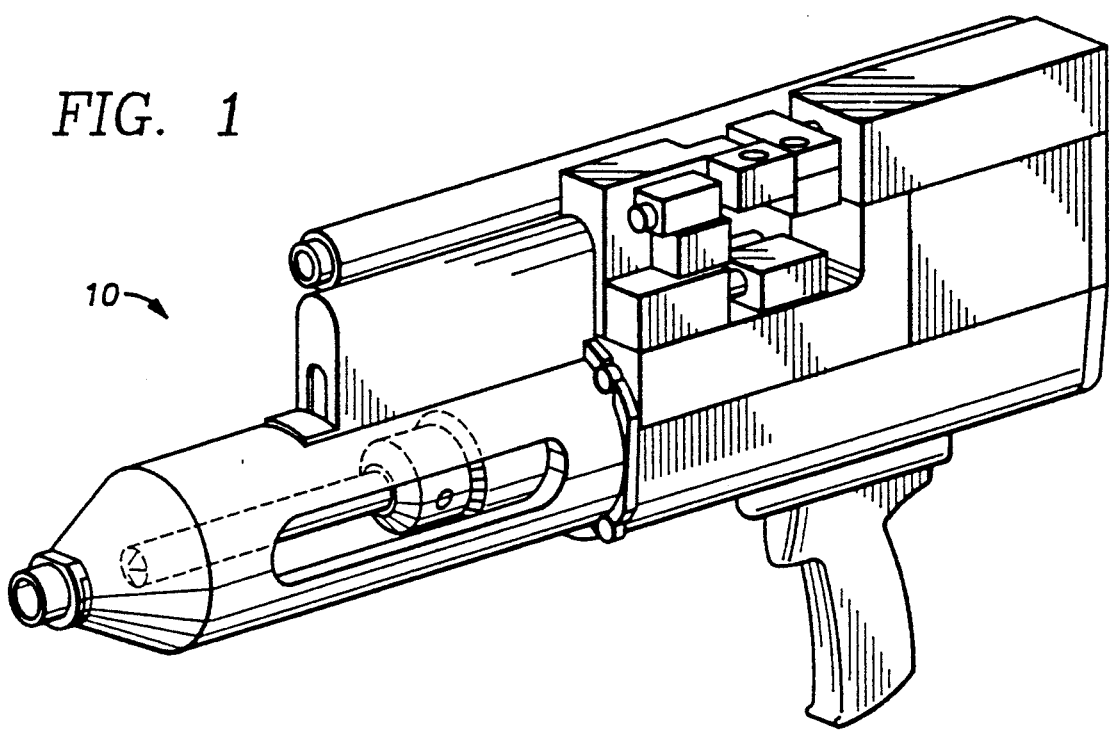
FIG. 1 is a, perspective view partially in cutaway, of an airfeed peck drill.

An airfeed peck drill 10 of the type incorporating the air logic circuit of the present invention is shown in FIG. 1. Such tools are characterized by operating in a pecking fashion. This peck type drilling includes the insertion, extraction and reinsertion of a rotating drill bit 12 into a hole. It has been found that this manner of drilling a hole provides extremely accurate holes with very smooth internal surface finishes. These results are accomplished because the flutes of the drill are purged of metal shavings or chips each time the drill is pecked out of the hole and the drill tip is allowed to cool when it is not in contact with the bottom of the hole being drilled.

Air logic circuits are used to control the insertion, extraction and reinsertion of the rotating drill bit 12 of a drill quill 110 into the hole being drilled. The drill quill 110 is a shaft having a chuck 112 projecting from one end 114 thereof and supported therein by a drill shaft on bearings (not shown). An air motor (not shown) is geared to the drill shaft to cause rotation of the drill chuck 112 to rotate the drill bit 12. The opposite end 116 of the drill quill forms a piston 118 which is held in a cylindrical piston cavity 122. Piston 118 is a dual acting/double sided piston. Drill quill piston apply side 124 of piston 118 has a cross section substantially equal to the circular cross section of piston cavity 122. Drill quill piston retract side 126 is substantially smaller in effective cross section than apply side 124. Thus, if the air pressure on each side of the piston is equal, the force on piston apply side 124 will exceed that on retract side 126. Differential forces activate drill quill 110 in cavity 122 to actuate drill bit 12 in and out of the hole.

Piston cavity 122 is linked to the air logic circuit through apply feed passage 128 and retract feed passage 132. Drill quill 110 is mechanically linked to a motor control valve 130, which is a simple poppet, or air biased on valve, through a motor actuation arm 136. Valve 130 includes plunger 138 which projects therefrom, and which, when depressed by actuation arm 136, disconnects the air pressure from the air motor causing the drill bit 12 to stop rotating.

Figure 3:
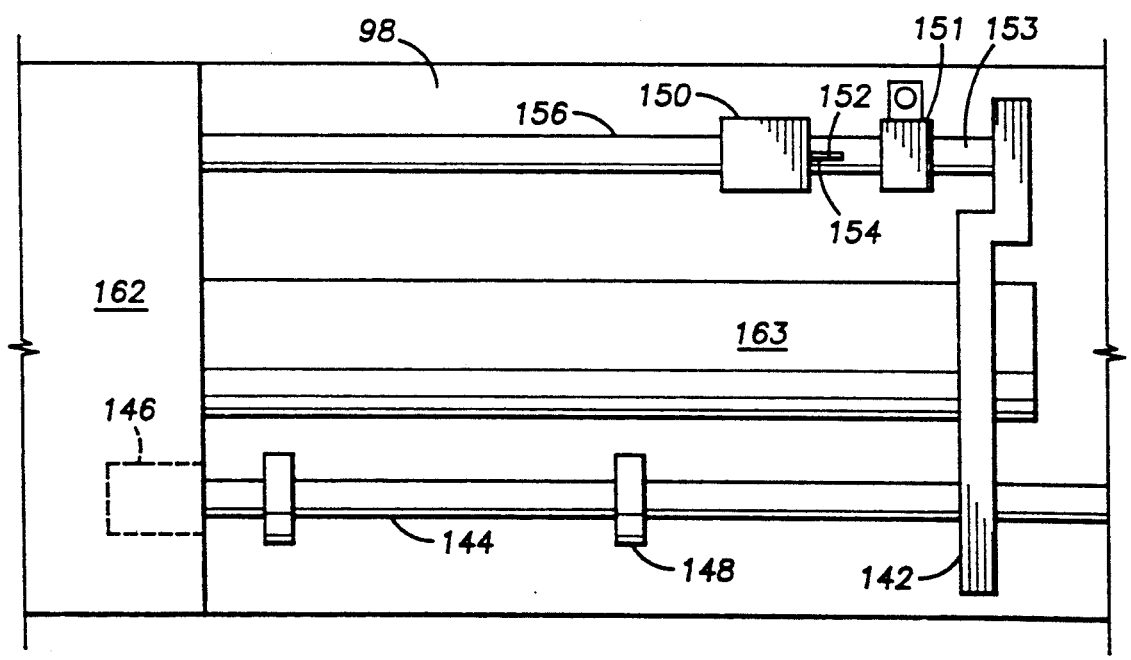
FIG. 3 is a top cutaway view of a portion of the mechanical linkage of the air logic circuit of the airfeed peck drill.

Actuation of the drill quill 110 to insert bit 12 into the hole causes the mechanical actuation of a series of linkages contained in a linkage cavity 98 disposed above the drill quill 110. Cross bar 142 (best shown in FIG. 3) is mechanically linked to a main rod 163, which is linked to actuate with the drill quill 110. Actuation of main rod 163 causes cross bar 142 to engage depth plunger 144 which is a rod extending into the linkage cavity 98 of the airfeed peck drill 10. Depth plunger 144 is slidable and linked to depth valve 146, which is likewise a poppet valve. Depth plunger 144 includes depth adjustment linkage 148, which is adjustably located thereon. When cross bar 142 engages adjustment linkage 148, movement of drill quill 110 is translated into equal lateral movement of depth plunger 144 to actuate depth valve 146. This actuation causes drill quill 110 to reverse its travel, as will be discussed further herein. By adjusting the location of linkage 148 relative to cross bar 142, the depth of the hole being drilled is controlled.

Hydraulic rod 156 is disposed to fully extend from the housing 162 containing the circuitry before a peck drilling cycle begins and engages against peck linkage 151 which is adjustably located on a secondary rod 153 colinearly aligned with hydraulic rod 156. Peck linkage 151 extends upward from secondary rod 153 to engage the lower half of hydraulic rod 156, but does not extend sufficiently above secondary rod 153 to interfere with the travel of cross bar 142. Upon the initiation of peck drilling, drill quill 110 is actuated toward the hole being drilled by air pressure on the apply side 124 of piston 118, causing movement of cross bar 142 across cavity 98 to engage the valve 150 disposed on the end of hydraulic rod 156, which rod is linked at its opposite end to an adjustable hydraulic damping piston (not shown). Hydraulic damping piston contains a bleed orifice, so that actuation of hydraulic rod 156 therein results in a relatively constant opposing force on rod 156. The force of the damping piston against the action of crossbar 142 is communicated to drill quill 110 through reaction rod 163, and the drill quill 110 slows down in response thereto, such that the drill bit 12 slowly engages the bottom of the hole. The force of the damping piston on the reaction rod 163 also depresses the advance plunger 152. The undampened forward movement of the drill quill is commonly known as rapid advance. Engagement of the advance valve plunger 154 by the crossbar 142 actuates the timing circuit 170. Timing circuit 170 is a pneumatic timing device which is disposed to cause the drill quill 110 to retract the bit 12 from the work piece after a preselected period of time, as will be further described herein. As drill quill 110 actuates bit 12 out of the hole, the hydraulic rod 156 is mechanically restricted from actuating out of the hydraulic piston, so that the amount of travel between the fully retracted cross bar 142 and hydraulic rod 156 increases with each in and out peck cycle of the drill bit. The mechanical linkage allows a small amount of retraction from the piston such that the drill quill 110 will be dampened in its forward travel just before the bit 12 reaches the bottom of the hole.

Cross bar 142 also actuates an advance valve 150. Advance valve 150 is a poppet valve mounted to a hydraulic rod 156 and includes an advance plunger 154, which is the plunger for the advance valve 150, extending therefrom opposite hydraulic rod 156. As cross bar 142 advances across cavity 98, it engages valve 150 and depresses plunger 154, which actuates the air timer of the peck drilling cycle as will be further described herein.

Figure 2:
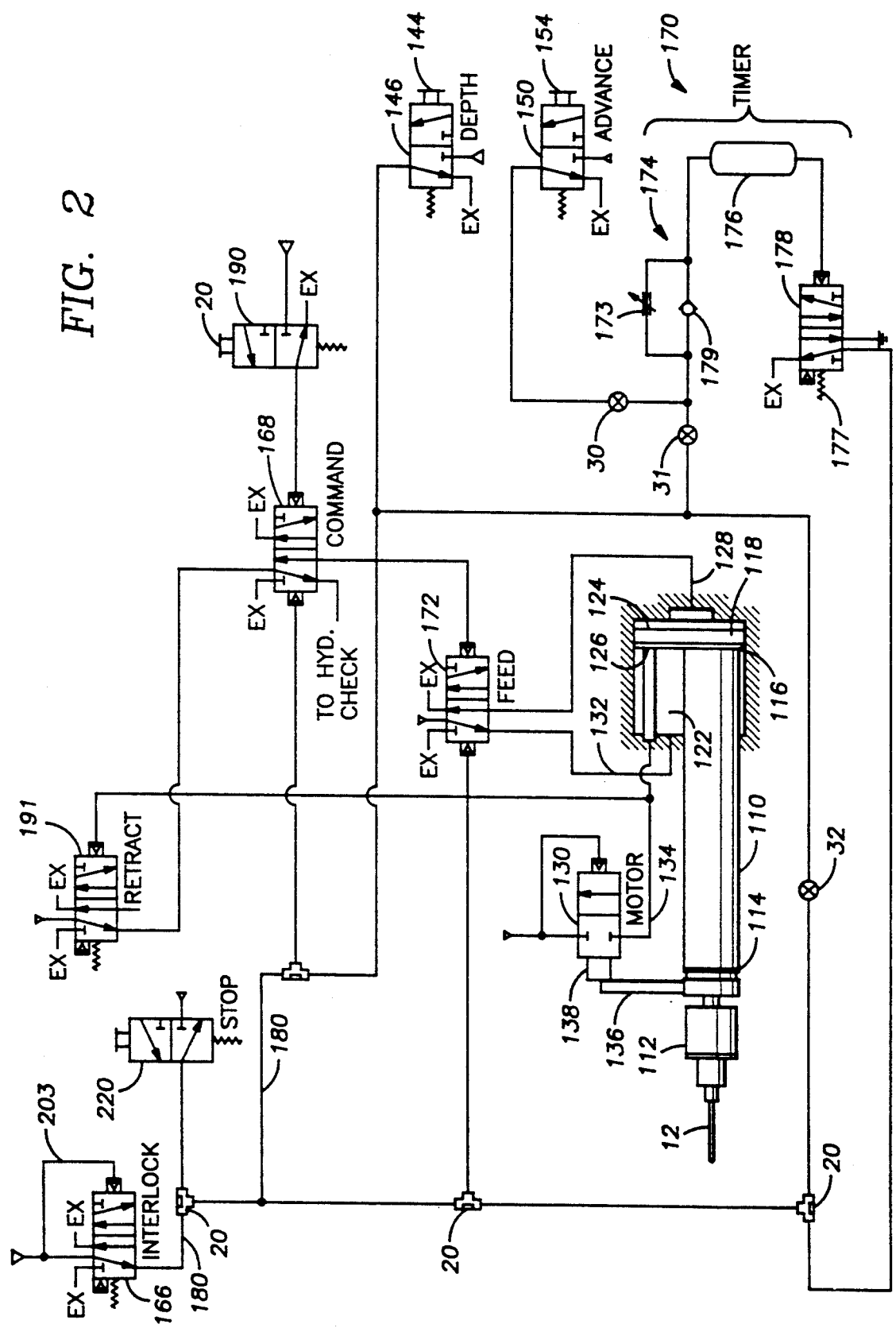
FIG. 2 is a schematic diagram of the air logic circuit for an airfeed peck drill.

In FIG. 2 a schematic diagram of the air logic circuit for the airfeed peck drill is shown. In this diagram, the tool is shown in the retracted position and the main air supply has been disconnected from the tool 10. All valves are shown in their reset, or default, position. The small triangles adjacent the valves represent the main air supply. The letters EX stand for exhaust. Additionally, the circuit includes shuttle valves 20, on-off valves 30, 31 and 32, a flow control valve 174 and an accumulator 176. The flow control valve 174 and accumulator 176 in conjunction with a timer valve 178 form a timer circuit 170. Each shuttle valve 20 is a tee valve having an orifice therein, such that air entering the valve from either end of the tee is diverted to the stem and blocked from passage across the tee.

The valves create a pneumatic control circuit for controlling the actuation of the piston 118 in cylinder 122 to cycle the drill quill 110, and thus drill bit 12, in and out of the hole. The airfeed peck drill has several operational configurations, which are selected by selectively opening or closing valves 30, 31 and 32 to isolate selected circuit components. In the conventional drill mode, the circuitry permits the drill quill 110 to continue feeding bit 12 into the hole until a preset depth is reached. This depth is selected by varying the position of adjustable linkage 148 on depth plunger 144. Moving linkage 148 further from the fully retracted position of crossbar 142 results in a deeper hole. The second possible configuration is the dwell configuration. In this configuration, the drill quill 110 advances bit 12 to the bottom of the hole, and a time circuit is actuated. After a predetermined period of time, the timer circuit actuates the feed valve 172 to retract the drill quill 110. The period of time is varied by varying the size of an orifice 173 in the flow control valve 174. Timer circuit 170 includes flow control valve 174, having a check valve 179 and orifice 173, an accumulator 176, and a spring loaded timer valve 178. Orifice 173 is adjustable to permit varying air transfer therethrough, and check valve 179 prevents air from by-passing orifice 173. Check valve 179 allows accumulator 176 to vent through advance valve 150 when advance plunger 152 is not actuated. The third possible configuration is the peck drill configuration. In this configuration, drill quill 110 actuates bit 12 into a workpiece to drill a hole, at the same time actuating the timer circuit. After a predetermined time, the timer circuit actuates the circuit to retract the drill quill 110. During retraction, the hydraulic rod 156, on which advance valve is disposed, does not fully recover out of the hydraulic piston but is retained therein by a mechanical one way ball clutch. After fully retracting, drill quill 110 again moves forward to insert the drill into the hole. However, advance valve 150 on the end of hydraulic rod 156 is not actuated until cross bar 142 engages plunger 152, at which time circuit 170 is actuated. The increased distance between the crossbar 142 actuation and engagement with the advance valve 150 and hydraulic rod 156 permits the drill quill 110 to rapid advance the bit 12 to the area adjacent the bottom of the hole, whereby the force of the hydraulic piston slows the drill quill 110 to slowly move the bit 12 to the bottom of the hole. Each peck cycle increases the distance between the crossbar 142 and the advance valve 150 on the hydraulic rod 156. This increasing distance in turn lengthens the rapid advance time of the peck drill cycle. In prior art designs, the timing circuit, which controls the duration of each peck cycle, activates as the drill quill 110 moves toward the workpiece. Therefore, the time spent drilling out the hole during each cycle decreases as the duration of the rapid advance portion of each peck cycle increases. By placing an advance valve on the hydraulic rod 156 to actuate only after rapid advance is completed, the duration of the hole drilling portion of each peck drilling cycle is relatively equal.

Referring to FIG. 2, operation of the tool in any mode begins with applying air to the tool which activates the interlock valve 166. This sends a puff of air to the command valve 168 and feed valve 172, resetting them to the piston retract position. Interlock valve 166 is set to a off position with air pressure in passage 203, and remains in this position until air supply is removed from the tool 10. Each of the valves in the hydraulic circuit is interlinked through a series of passages 180 to interconnect together. Passages 180 can be valve body worm tracks, hoses or other sealed passageways. Start valve 190 is a poppet valve, which is biased to exhaust air from the command valve 168 when it is not actuated. When the start valve 190 is actuated by depressing plunger 202, air underpressure from the air supply passes therethrough to access command valve 168.

Depressing the start button 202 sets the command valve 168. Setting command valve 168 allows air to flow therethrough from the retract valve 191 to the feed valve 172. This biases the feed valve 172 to permit the source air to flow therethrough, which causes the piston 118 to feed the drill quill 110 forward and the air motor to run. Air is communicated from the motor valve 130 through passage 134 which sets and maintains the retract valve 191.

The drill mode chosen determines what happens next. The mode is selected by the configuration array of the on-off valves 30, 31 and 32. In the conventional mode of operation, valves 30 and 31 are closed, while valve 32 remains open, and the tool will continue to feed forward until either the depth valve 146 or stop valve 220 is depressed. The signal from either the depth valve 146 or the stop valve 220 shuttles both the command valve 168 and feed valve 172 to their reset positions. When in these reset positions the tool is caused to retract and shut off by the actuation of air into retract side 126 of piston cavity 122.

In the dwell mode of operation, valves 30 and 32 are closed, and valve 31 remains open. The tool will feed forward, and if not interrupted by the stop valve 220, the cross bar 142 will engage the depth plunger 144 to actuate the depth valve 146. When the depth valve 146 is actuated, air will be diverted to the timer circuit 170. After a predetermined amount of time has elapsed, the timer valve 178 will actuate and reset the feed valve 172 and command valve 168 to send the quill back to the beginning of its stroke and turn the motor off. Timer valve 178 actuates when the pressure in accumulator 176 is sufficient to overcome the force of bias spring 177 which biases the timer valve 178.

The peck mode of operation is selected by closing valve 31, and leaving valves 30 and 32 open. Peck mode is identical to the dwell operation except for two key points. First, the timer 170 is fed with air from the advance valve 150. This permits the timer circuit 170 to actuate only when the advance valve is actuated, which permits the duration of workpiece drilling to be independent of the duration of rapid advance as advance valve 150 is actuated by cross bar 142 only after the end of rapid advance. And secondly, when the timer 170 reaches a preset time, only the feed valve 172 is shuttled and not the command valve 168. This means that when the tool is retracted, the motor valve 130 shuts off, removing its signal from the retract valve 191. Air is then fed from the retract valve 191 through the set command valve 168 and shuttles the feed valve 172 to its feed position. The feed and retract action continues until the cross bar 142 engages the depth plunger to actuate depth valve 146, or the stop valve 220 is actuated by the user, which sends the quill 110 back to the beginning of its stroke and turns the motor off.

The foregoing embodiment is intended to illustrate the present invention and not to limit it in spirit or scope.

We claim:

1. A source air controlled feed peck drill for actuating a drill bit into a workpiece to drill a hole comprising:
   an air actuated reciprocating drill quill;
   a drill chuck disposed on the first end of said drill quill for holding the drill bit;
   a double-sided piston disposed on the second end of said drill quill and received within a piston cavity;
   an air circuit logic means for controlling the actuation of said piston in said piston cavity, said logic means including an air actuated timer to regulate the duration of drilling of the drill bit into the workpiece having a triggering valve disposed to actuate said timer only after said drill quill has moved the drill bit into position adjacent its working position to begin drilling material from the workpiece.

2. The airfeed peck drill quill of claim 1, wherein said timer includes an accumulator actuated poppet valve; and
   said triggering valve isolates the accumulator from source air until said drill quill has actuated through rapid advance.

3. The airfeed peck drill of claim 1, wherein said drill quill is linked to a mechanical cross bar, wherein said drill disposed in a linkage cavity, whereby actuation of said drill quill in said piston cavity actuates said cross bar in said cavity.

4. The air feed peck drill of claim 3, further including a damping piston having a hydraulic rod projecting into said linkage cavity and having said triggering valve thereon, whereby actuation of said cross bar engages and activates said triggering valve and said damping piston.

5. A fluid controlled feed peck drill having a working fluid primary circuit controlled reciprocating drill quill situated to actuate a rotatable drill bit in and out of a hole being drilled into a workpiece, the improvement therein comprising:
   a secondary timing means, interactive with the fluid primary circuit, actuable upon actuation of the drill bit into position adjacent the working surface of the hole, whereby said secondary timing means interacts with the fluid primary circuit to control the duration of time the drill bit engages the working surface of the hole independently of the actuation of the drill quill to actuate the drill bit into the workpiece.

6. The peck drill of claim 5, wherein said secondary timing means is fluidly interconnected with said fluid primary circuit.

7. The peck drill of claim 5, wherein said timing means includes an accumulator actuated poppet valve.

8. The peck drill of claim 5, wherein said secondary timing means is actuated by a mechanical linkage interlinked with said quill, such that said mechanical linkage actuates said secondary timing means when said drill bit is located adjacent the working surface of the hole.

9. The peck drill of claim 1, wherein said mechanical linkage includes a linkage adjustment means which adjusts the travel of said mechanical linkage in response to each cycle of the drill bit in and out of the hole such that said mechanical linkage engages said secondary timer means at successively greater drill travel inward the hole on successive peck cycles to compensate for the increasing depth of the hole.

10. The peck drill of claim 5, wherein said secondary timing means includes an adjustment means to vary the duration of time the drill bit is in engagement with the working face of said hole.

11. The peck drill of claim 10, wherein said secondary timing means includes a flow control valve, a check valve and orifice, an accumulator and a spring loaded timing valve, whereby the duration of time the drill bit spends adjacent the working surface of the hole is adjusted by varying the size of said orifice.

* * * * *